UNITED STATES PATENT OFFICE.

BENJAMIN T. BABBITT, OF NEW YORK, N. Y.

IMPROVEMENT IN THE PROCESSES FOR COATING CAUSTIC ALKALIES.

Specification forming part of Letters Patent No. 150,509, dated May 5, 1874; application filed February 7, 1874.

*To all whom it may concern:*

Be it known that I, BENJAMIN T. BABBITT, of New York, in the county and State of New York, have invented an Improved Process for Coating Caustic Alkalies, of which the following is a specification:

This invention relates to a process for putting up and hermetically inclosing packages of caustic alkali for family or other use by coating or enveloping them with a substance or composition which is solid at ordinary atmospheric temperature, but capable of fusion or solution; and it consists in submerging the packages in the substance while in a liquid state in a vessel in which a vacuum is created above the surface of the liquid, whereby the coating or envelope is brought into perfect and uniform contact with all portions of the surface of the alkali without any collection or retention of air between them, and deliquescence is rendered impossible.

In carrying out my invention, I mold the alkali into balls, blocks, or cakes of suitable form and size for family use, and then cover them directly with the coating or envelope, while the substance or composition of which it is made is in a state of fusion or solution.

The substance used for coating may consist of any of the following well-known articles, or any mixture of them which will serve the desired purpose, (preference being given to such as will saponify when the alkali is to be used in making soap,) namely: Rosin, coal-tar pitch or asphaltum, bees-wax, stearine, paraffine, tamarack gum, hemlock gum, tragacanth, or shellac.

I prefer, however, to use a mixture of tallow and rosin, in the proportions of about two ounces of tallow to one pound of rosin, as I find that such mixture is of the proper consistency, and both ingredients are saponifiable.

The coating may be applied in the following manner: The substance or composition of which it is to be made is contained in a suitable vessel, which is made air-tight when closed, and in which the said substance or composition is kept in a fluid state by heat or otherwise. The balls or blocks of alkali, which have been cast while in a fused state into the desired shape, are suspended from the cover of the vessel by thin wires, which are inserted in them when they are molded. When the cover is placed on the vessel, the balls sink into the liquid coating substance until entirely submerged therein.

The cover fits the vessel with an air-tight joint, and, after it is in place, the air is exhausted from the vessel by means of an air-pump or other suitable apparatus, and a vacuum created between the surface of the composition and the under side of the cover. This exhausts the particles of air from the liquid itself, and also from between it and the surfaces of the blocks, enabling the composition to be brought into positive and uniform contact with every portion of the surface of each block, filling all cavities or irregularities which may exist on such surfaces, so as to leave no air-spaces between the surface of a ball and the inner surface of its coating.

When the alkali has remained a sufficient length of time in the composition, the air is again admitted to the vessel, the cover removed, and the balls or blocks allowed to remain suspended by the wires until sufficiently hard and dry to allow of their being packed for transportation or put away for use.

By this mode of protecting the alkali, the coating or envelope may be applied to blocks or cakes of any size or any form, and the contact is positive and uniform, so that no particles of air can exist between the alkali and the coating, and deliquescence is rendered impossible.

In addition, the coating substance being capable of saponification, there is no waste of material, as in the case of a package put up in a metal or fibrous case or wrapping.

In case of any tendency to stickiness appearing in the surface of the coating, the finished packages may, if desired, be dipped in a cold preparation of cooked starch or glue, or an alcoholic solution of shellac or other gum, or a solution of alkaline silicate.

What I claim as new, and desire to secure by Letters Patent, is—

The process for coating packages of caustic alkali with a substance or composition which is solid at ordinary atmospheric temperature, but capable of fusion or solution by submerging the packages in the substance or composition while in a liquid state in a vessel in which a vacuum is produced, substantially as herein described.

B. T. BABBITT.

Witnesses:
HENRY T. BROWN,
FRED. HAYNES.